United States Patent [19]

Levine

[11] Patent Number: 4,670,787
[45] Date of Patent: Jun. 2, 1987

[54] SUPPRESSION OF FIELD-RATE BRIGHTNESS VARIATIONS FOR A TELEVISION CAMERA

[75] Inventor: Peter A. Levine, Trenton, N.J.

[73] Assignee: RCA Corporation, Princeton, N.J.

[21] Appl. No.: 760,908

[22] Filed: Jul. 31, 1985

[51] Int. Cl.$^4$ .......................... H04N 5/58; H04N 5/52
[52] U.S. Cl. ..................................... 358/161; 358/174
[58] Field of Search .............. 358/228, 174, 176, 161, 358/168, 169

[56] References Cited

U.S. PATENT DOCUMENTS

| | | | |
|---|---|---|---|
| 3,010,362 | 11/1961 | Smith ................................. | 358/228 |
| 3,586,773 | 6/1971 | Niemyer, Jr. et al. ............ | 358/228 |
| 4,187,519 | 2/1980 | Vitols et al. ....................... | 358/169 |
| 4,302,780 | 11/1981 | Yamazaki et al. ................. | 358/228 |
| 4,516,172 | 5/1985 | Miyata et al. ..................... | 358/228 |

Primary Examiner—Gene Z. Rubinson
Assistant Examiner—Stephen Brinich
Attorney, Agent, or Firm—Peter M. Emanuel; Lawrence C. Edelman; Thomas F. Lenihan

[57] ABSTRACT

A television camera includes optics for directing light from an illuminated scene to an imager, a signal processor for developing a video signal from an imager supplied signal, and apparatus for controlling the magnitude of the developed video signal to reduce brightness variations (flicker) caused by artificial scene illumination. The controlling apparatus develops a first signal representative of the average illumination of the scene, a second signal representative of the amount of the directed light which the imager actually responds to, and a control signal in response to the signal processor for controlling the magnitude of the developed video signal.

9 Claims, 5 Drawing Figures

SUPPRESSION OF FIELD-RATE BRIGHTNESS VARIATIONS FOR A TELEVISION CAMERA

FIELD OF THE INVENTION

The present invention relates to a television camera arrangement to suppress, in a developed video signal, brightness variations (flicker) caused by artificial illumination.

BACKGROUND OF THE INVENTION

Television camera imagers, i.e., pickup tubes and solid-state devices such as charge coupled devices (CCD's), recurrently produce a charge pattern therein in response to a light image incident on a photosensitive surface thereof during what are commonly called optical integration intervals. Generally, the optical integration intervals coincide with the television field trace intervals. It is known to include a light-blocking shutter between the lens and imager of a television camera to limit the integration interval to a fraction of the television field trace interval. The reduced time that light is incident on the imager makes it possible for the image reproduced from each field of the image-representative signal to have very little motion induced blurring. Consequently, television cameras such as those including shutters are well suited for use at sporting events so that images with reduced blur can be provided during slow motion image replay.

One problem which may result when using a shuttered television camera, and which may result to a lesser extent in television cameras without a shutter, is a field-to-field brightness variation (flicker) in the video signal derived from the imager. The flicker results from brightness variations in areas lit up by artificial illumination, such as in a sports arena. Such brightness variations are usually caused by the peak-to-peak alternating current (AC) voltage swings of the power source for the illumination. For example, if the artificial illumination comprises flourescent lighting powered by a 60 Hz AC power source, the illumination will have brightness variations at a 120 Hz rate. Since the television camera field rate is not synchronized to the illumination power source, flicker may result in the video signal developed by the camera.

In addition, the television camera may include a shutter. If, for example, the shutter allows only one five-hundredth of a second exposure during each television field interval, since the operation of the shutter is not synchronized with the illumination power source, the shutter passes light to the imager which more closely follows the brightness variations of the illumination. Thus, the video signal provided by the camera will have pronounced brightness variations occurring at a rate corresponding to the difference in frequency (i.e., beat) between the television field rate and the illumination brightness variation rate. FIG. 1 of the drawing illustrates this effect, wherein waveform 10 corresponds to the illumination variations of an artificial light source, such as a flourescent light, about an average value A. Since the camera shutter is not synchronized with the illumination variation rate, the amount of light passed by the shutter opening during successive shutter opening intervals ($T_1$, $T_2$, $T_3$, etc.) follows the changes in the illumination.

Even in television cameras which do not include a shutter and which operate at a field rate of 60 Hz (in accordance with the NTSC television standard), if the AC power source is 60 Hz, brightness variations may occur at a relatively slow but nevertheless annoying rate, due to the aforementioned lack of synchronization. Furthermore, if a 60 Hz field-rate television camera without a shutter is used in an area having a 50 Hz power source for its illumination (such as in many European countries), a much faster and therefore even more annoying flicker will result.

Consequently, three-phase AC power is often used for artificial illumination in areas where television cameras may be used, and especially when such television cameras are of the shutter type. Three-phase power for lighting results in a more uniform illumination and, therefore, greatly reduces the potential for video signal flicker.

However, with the advent of small, lightweight, and therefore highly portable television cameras, and in particular cameras using solid-state imagers, television cameras are being used in a variety of uncontrolled illumination situations. Consequently, it is desirable to provide apparatus to reduce the possibility of field-rate flicker in the video signal provided by television cameras in such situations. Although brightness variations could be removed by a video AGC (automatic gain control) circuit in the camera, most commercial (broadcast quality) television cameras do not include AGC since such circuits can be easily fooled by small area illumination highlights, and prevent accurate reproduction of the scene illumination. Consumer type television cameras may include an AGC circuit and even an automatic iris, i.e., a lens iris which opens and closes in response to scene illumination. However, these features do not adequately solve the flicker problem because the time constant of the AGC and auto-iris circuits are typically on the order of one second (to avoid annoying rapid fluctuation of image brightness), while video signal flicker due to brightness variations induced by an artificial light source may be on the order of one-tenth of a second (e.g., when using an NTSC television camera in a European country) and therefore cannot be adequately controlled by the AGC or auto-iris circuits in consumer type cameras.

SUMMARY OF THE INVENTION

Apparatus in accordance with the present invention is included in a television camera having an imager which responds to light received from a scene during recurrent time periods for developing an image-representative signal, and having signal processing means for developing a video signal from the image-representative signal. The disclosed apparatus develops a control signal related to the average scene illumination and to the amount of light received by the imager during each of the recurrent time periods, for controlling the magnitude of the video signal developed by the camera.

DETAILED DESCRIPTION OF THE DRAWING

Figure 2:
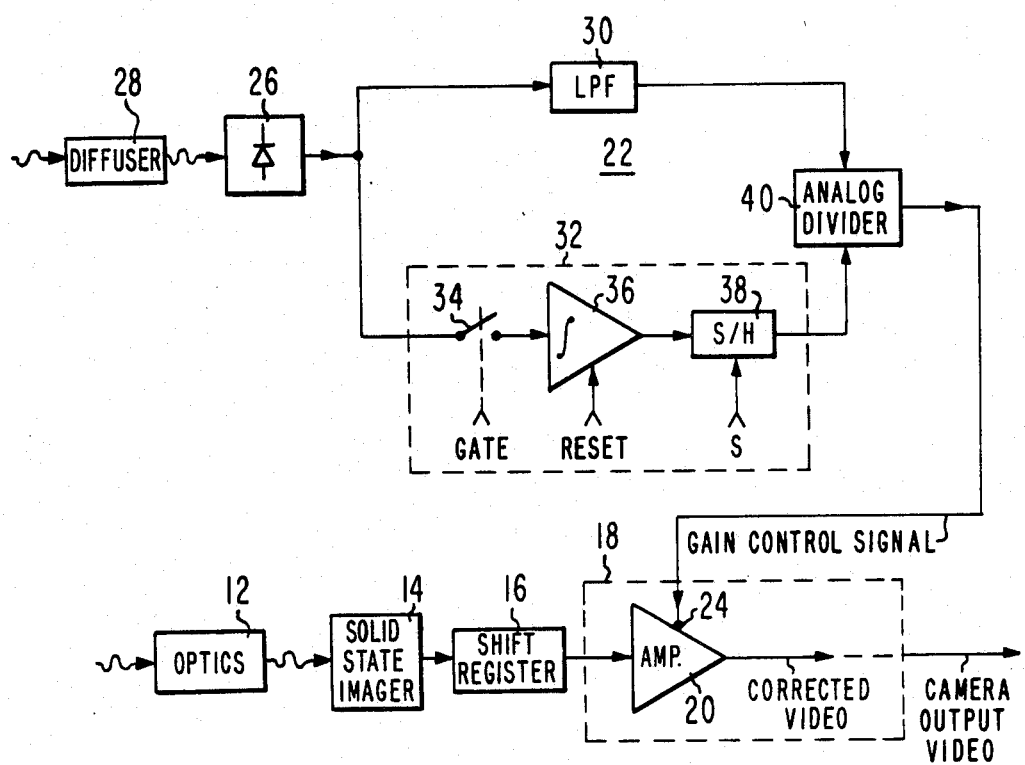
FIG. 2 illustrates, in block diagram form, a television camera including brightness variation suppression apparatus in accordance with the present invention.

In the television camera of FIG. 2, optics 12 directs light (which may include infrared radiation) from a scene onto the imaging area of a solid-state imager 14, such as the SID504 frame transfer CCD imager available from RCA Corporation, New Products Division, Lancaster, Pa. Briefly, a frame transfer CCD imager includes a photosensitive imaging area register (A) for developing (integrating) a charge pattern representative of the light reflected from the scene, a storage area register (B) which is masked from the scene illumination and into which the A register charge pattern is transferred once each television field and a line register (C) which reads out the charges stored in the B register one line at a time during the next television field interval. During read out of the lines stored in the B register, the next charge field is being developed (integrated) in the A register. A signal voltage is derived from the C register output charges of imager 14 via a signal recovery circuit 16 of conventional design, and may comprise, for example, a correlated double-sampling circuit as is known. The signal voltage is then processed into a video signal via conventional camera signal processing circuits 18, including an amplifier 20 for providing a corrected video signal from which the camera output signal is ultimately derived. Flicker suppression apparatus 22 according to the invention produces a gain control signal for application to a gain control input 24 of amplifier 20 for controlling the gain of amplifier 20 so as to suppress any brightness variations in the video signal caused by the scene illumination.

Figure 1:
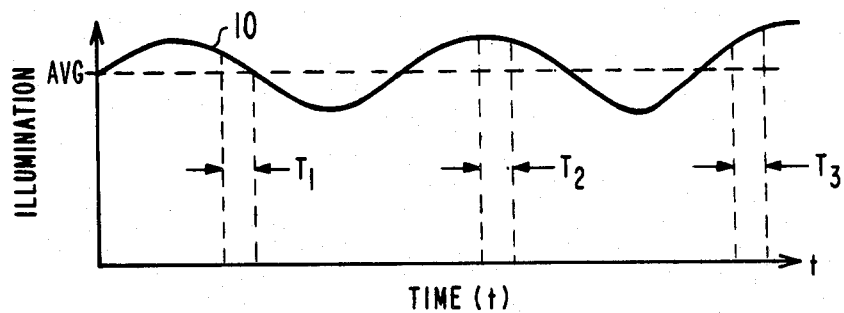
FIG. 1, already described, illustrates a waveform representative of scene brightness variations resulting from artificial illumination.

Flicker suppression apparatus 22 includes a photosensitive diode 26 mounted inside the television camera for receiving light from the scene to be televised via an optical diffuser 28 placed across an opening in the camera housing (not shown). Diffuser 28 is constructed to limit the field-of-view of diode 26 to approximately the same field-of-view as imager 14, and to also diffuse the light passed to diode 26 so as to prevent erroneous readings of scene illumination due to intense small area illumination variations, i.e. point light sources, reflections, etc. Thus, the output signal of diode 26 resembles waveform 10 of FIG. 1 when receiving light from a scene illuminated as indicated by waveform 10, and represents in real time the instantaneous illumination of a scene having brightness variations due to the use of an AC power source for artificial illumination. Photosensitive diode 26 preferably has the same spectral response characteristic as imager 14.

The output of diode 26 is applied to a low pass filter 30 having a bandwidth such that its resulting time constant is considerably longer than the expected illumination flicker rate, e.g., a time constant of approximately one second, to produce a very slowly charging output voltage resembling a DC signal voltage representative of the long-term (average) illumination of the scene. This DC voltage corresponds to average level "A" in FIG. 1. The output of diode 26 is also applied to an integrator network 32 including a switch 34 which selectively supplies the signal from diode 26 to the input of an integrator 36 is response to a GATE signal. The GATE signal has a pulse width equal to the time duration of the imager integration interval, thereby causing the magnitude of the signal at the output of integrator 36 to track the average amount of charge integrated by imager 14. The output of integrator 36 is reset to zero once each television field interval by a RESET pulse applied to integrator 36. A sample timing signal S, which occurs at the end of each television field interval, causes a sample-and-hold circuit 38 to sample the output of integrator 36 before it is reset by the RESET signal in preparation for integrating the next television field.

Figure 3:
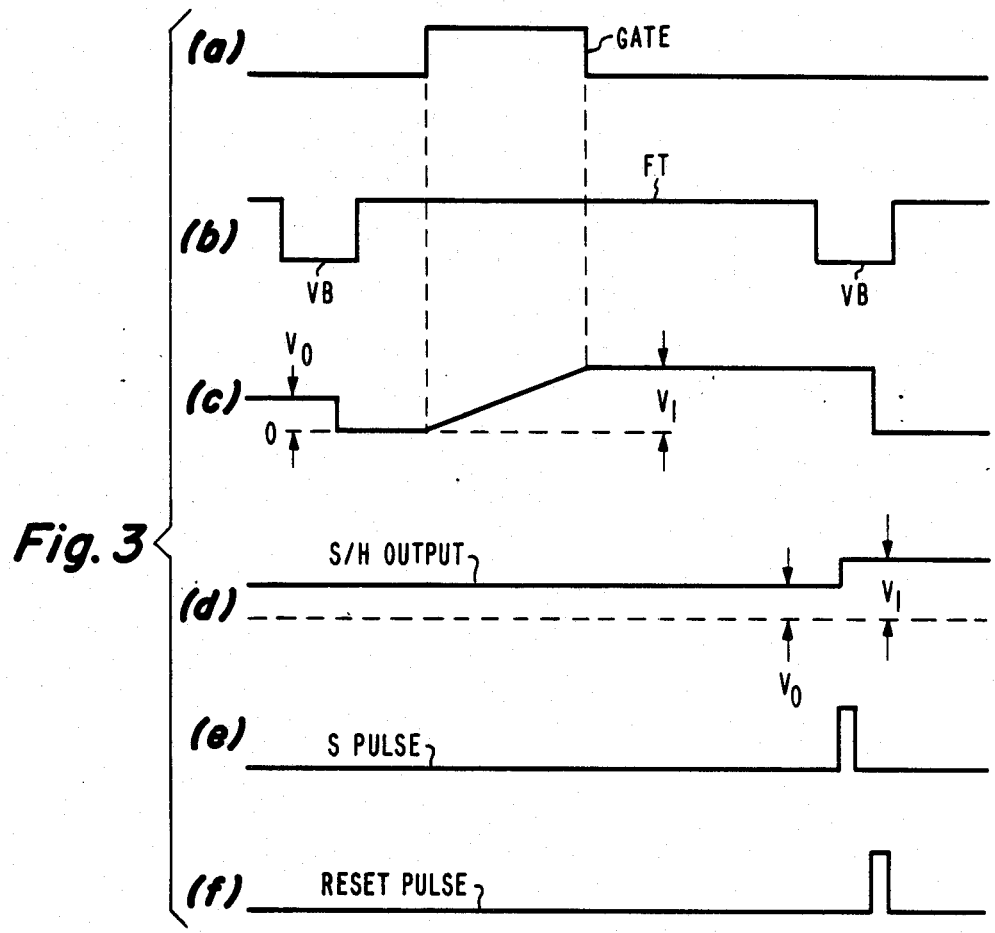
FIG. 3 illustrates waveforms useful for understanding the operation of the apparatus of FIG. 2.

Referring to FIG. 3 for the moment, waveform (a) illustrates the GATE signal, which includes a pulse timed to occur during the field trace (FT) interval of a television signal which is illustrated by waveform (b). A vertical blanking (VB) interval occurs at the end of each FT interval. Waveform (c) illustrates the output of integrator 36, which increases during the interval of the GATE signal and then maintains the output magnitude reached at the end of the GATE signal until it is reset to zero by the RESET pulse, illustrated by waveform (f). The sample pulse S, illustrated by waveform (e), is timed to occur shortly before the RESET pulse, and causes the output of the sample-and-hold circuit 38, illustrated by waveform (d), to change from $V_O$ (the maximum output of integrator 36 during the prior television field trace interval), to $V_1$ (the maximum output of integrator 36 during the present field interval). The output of sample-and-hold circuit 38 maintains the $V_1$ output magnitude until the next field interval, when the next S pulse occurs. Thus, the output signal of sample-and-hold circuit 38 is representative of the amount of charge integrated by imager 14 in the prior television field. Therefore, the signal amplitude at the output of sample-and-hold circuit 38 varies with time in a manner corresponding with the amount of charge integrated by solid-state imager 14, i.e., it has an AC signal component related to the beat frequency between the imager field rate and the illumination power source rate. The time constant for integrator 36 preferably should be considerably shorter than that for low pass filter 30, such as 0.01 seconds.

An analog signal divider 40 provides an output correction signal corresponding to the ratio of the magnitude of the output signal of sample-and-hold circuit 38 to the magnitude of the long-term average output signal of low pass filter 30. Analog signal divider 40 is of conventional design and includes two logarithmic amplifiers, a subtraction circuit and an anti-logarithmic circuit, as well known. The correction signal from divider 40 is the gain control signal applied to amplifier 20 for suppressing flicker for each individual television field. Since a field transfer imager includes a field storage register, the video signal supplied from the imager is delayed by one television field. Therefore, the gain control signal, which is also delayed by one television field due to the previously noted delay provided by sample-and-hold circuit 38, is properly timed when applied to amplifier 20 of signal processing circuit 18. In response to the gain control signal, the gain of amplifier 20 is adjusted during each field with a sense to compensate for the brightness variations detected by flicker suppression apparatus 22, thereby suppressing these brightness variations in the camera video output signal.

Figure 4:
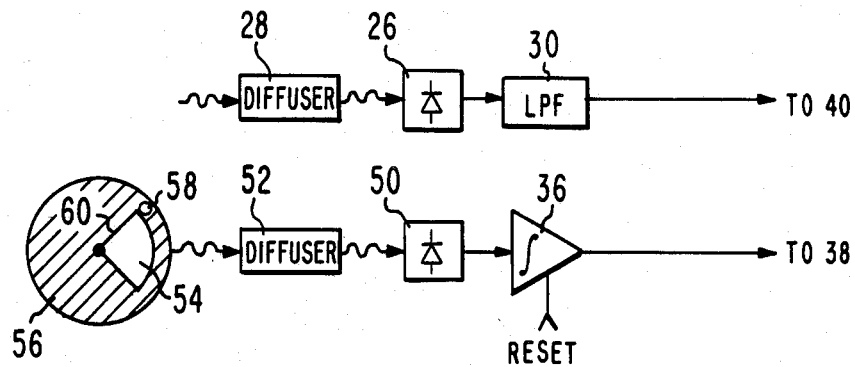
FIG. 4 illustrates an alternative embodiment of a portion of the brightness variation suppression apparatus illustrated in FIG. 2.

FIG. 4 illustrates an alternative embodiment of a portion of flicker suppression apparatus 22 of FIG. 2 which eliminates the need for switch 34 of integrator network 32 when the television camera includes a shutter. In FIG. 4 the long-term DC voltage component is generated in the same manner as in FIG. 2, namely via photosensitive diode 26, diffuser 28 and low pass filter 30. However, for developing the alternating voltage component from integrator 36, an additional photosensitive diode 50 is mounted in the camera housing behind an optical diffuser 52 which is similar to optical diffuser 28. Diode 50 receives light from the camera optical path via an opening 54 in an otherwise light-blocking, rotating disc shutter 56. Rotating shutter 56, which may be included in optics 12 of FIG. 2, rotates at a rate synchronous with the television field rate, causing shutter opening 54 to limit the integration time of imager 14 to something less than the television field interval. Specifically, opening 54 in shutter 56 is dimensioned such that when shutter 56 is rotated at a rate synchronous with the imager field rate, light is passed through to imager 14 for, for example, only one five-hundredth of a second. Since the only light received by photosensitive diode 50 is from the optical path behind rotating shutter 56, diode 50 also receives light for only one five-hundredth of a second each television field interval and develops a signal which exhibits amplitude variations which vary with time in the same way as the light passed to imager 14. The alternating voltage developed by integrator 36 of FIG. 4 is the same as the alternating voltage developed by integrator network 32 of FIG. 2, and therefore can be used for developing the gain control signal which is applied to signal processing circuit 18 for suppressing flicker.

If the television camera includes a shutter of the type illustrated in FIG. 4, the GATE signal (as explained in connection with FIG. 2) could be developed by using an additional photodetector (not shown) aligned with the rim of shutter 56. In such case, a hole 58 along the rim of shutter 56 is aligned with a leading edge 60 of opening 54 to cause the additional photodetector to provide an output for triggering a circuit such as a one-shot multivibrator (also not shown) for providing the GATE signal.

Figure 5:
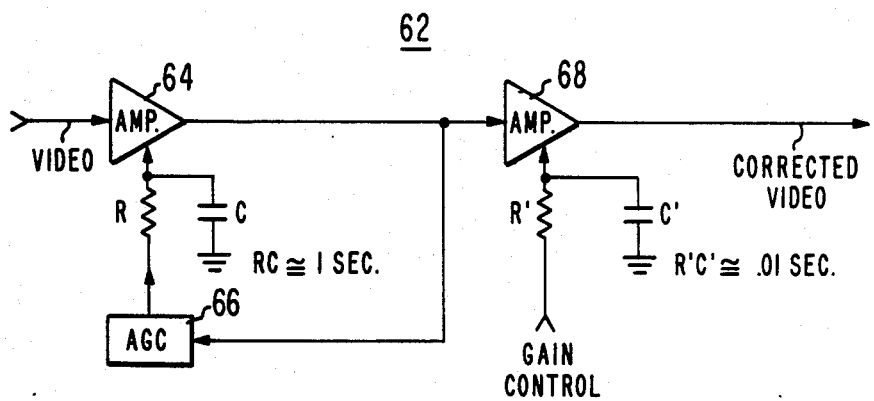
FIG. 5 illustrates the application of a brightness variation control signal, derived in accordance with the invention, to a video signal processing path of a television camera which includes provisions for automatic gain control (AGC).

In the FIG. 2 embodiment, it is assumed that signal processing circuits 18 do not include an automatic gain controlled (AGC) video signal amplifier. As previously noted, AGC video amplifiers prevent accurate reproduction of scene illumination and, therefore, are not included in many broadcast type television cameras. However, AGC video amplifiers are commonly used in consumer type video cameras. FIG. 5 illustrates an arrangement wherein the gain control signal is used to control the gain of signal processing circuits which include an AGC video amplifier.

Signal processing circuits 62 of FIG. 5 include a first gain controlled video amplifier 64 responsive to the video signal from a signal recovery circuit (e.g., corresponding to circuit 16 in FIG. 2). An AGC detector 66 of conventional design (e.g., a peak detector) develops an AGC control signal in response to the signal level at the output of amplifier 64, and applies the control signal to a gain control input of amplifier 64 via a resistor R and capacitor C having resistance and capacitance values which establish a time constant of approximately one second for the AGC operation. For suppressing brightness variations, the gain control signal (from analog divider 40 as shown in FIG. 2) is applied to the gain control input of a second amplifier 68 which receives input signals from the output of amplifier 64. A resistor R' and capacitor C' have values which establish a relatively short time constant, such as 0.01 seconds, for allowing relatively fast changes in the gain of amplifier 68 in response to the gain control signal. Thus, in a manner similar to the gain control of amplifier 20 in FIG. 2, gain control of amplifier 68 of FIG. 5 results in suppression of the undesirable brightness variation of the scene illumination.

The principles of the invention are also applicable to cameras including tube-type imagers. Due to the relatively long integration time of tube-type imagers (e.g., 1/30th of a second), annoying brightness variations due to artificial illumination of a scene generally do not occur. However, in tube-type cameras including a light-blocking shutter or having non-standard field rates, such as 180 Hz, objectionable brightness variations due to artificial illumination can be suppressed by apparatus in accordance with the present invention. Furthermore, cameras including solid-state imagers can be operated at field rates which are higher than the conventional television standard, or their optical integration time can be electrically shortened. Such cameras can also benefit from the use of the disclosed apparatus. Also, it should be clear that the invention can be used with other types of solid-state imagers such as the interline transfer CCD imager. Finally, although in the disclosed embodiment of the invention the signal inputs to analog divider 40 of FIG. 2 are developed using a photosensitive diode, it should be clear that the signal representative of the amount of light which the imager responds to during each integration interval and the signal representative of the average amount of light which the imager responds to over several integration intervals can both be derived by appropriate processing of the imager output signal.

What is claimed is:

1. In a television camera including optical means for directing light from an illuminated scene to an imager, said imager responding to said directed light during recurrent time periods for recurrently developing an image-representative signal, and signal processing means for developing a video signal from said image-representative signal, apparatus for controlling the magnitude of said video signal, comprising:
   first means for developing a first signal representative of the average illumination of said scene;
   second means for developing a second signal representative of the instantaneous amount of said directed light which said imager is responsive to during each of said recurrent time periods;
   third means responsive to said first and second signals for developing a control signal having magnitude variations related to said first and second signals; and
   means for coupling said control signal to said signal processing means for controlling the magnitude of said video signal.

2. Apparatus according to claim 1 wherein:
   said first means comprises means for developing a signal having magnitude variations representative of the average illumination of said scene, as said first signal.

3. Apparatus according to claim 2 wherein:
   said third means develops a signal having magnitude variations corresponding to the ratio of the magnitude variations of said first and second signals, as said control signal.

4. Apparatus according to claim 3 wherein said ratio corresponds to the division of the magnitude of said first signal by the magnitude of said second signal.

5. Apparatus according to claim 1 wherein:
said first means comprises a photosensitive device with an input for receiving light from said scene and an output, and a low pass filter coupled to said output of said photosensitive device;
said second means comprises an integrator coupled to said output of said photosensitive device and rendered operative to integrate during said recurrent time periods, and a sample-and-hold circuit coupled to the output of said integrator; and
said third means comprises means for providing an output signal corresponding to the ratio of the magnitude of output signals from said low pass filter to the magnitude of output signals from said sample-and-hold circuit.

6. Apparatus according to claim 1 further including:
fourth means for defining each of said recurrent time periods, during which said imager responds to said light, to be less than a television field trace interval.

7. Apparatus according to claim 6 wherein said fourth means comprises:
means for recurrently causing said imager to be non-responsive to said directed light during a portion of each of said active field intervals.

8. Apparatus according to claim 7 wherein said means for causing said imager to be non-responsive to said directed light comprises an optical shutter coupled between said optical means and said imager for recurrently blocking said imager from said directed light.

9. Apparatus according to claim 8 wherein said imager comprises a solid-state imager and said optical shutter comprises a rotating, substantially light opaque disc including a substantially light transparent portion therein.

* * * * *